(12) United States Patent
Reinhart et al.

(10) Patent No.: US 9,261,044 B2
(45) Date of Patent: Feb. 16, 2016

(54) CYLINDER GASKET HAVING OIL DRAINBACK CONSTRAINT FEATURE FOR USE WITH INTERNAL COMBUSTION ENGINE

(71) Applicant: Ford Global Technologies, LLC, Dearborn, MI (US)

(72) Inventors: Paul Thomas Reinhart, Livonia, MI (US); Mark Brenkus, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/153,420

(22) Filed: Jan. 13, 2014

(65) Prior Publication Data

US 2015/0198115 A1 Jul. 16, 2015

(51) Int. Cl.
*F02F 7/00* (2006.01)
*F16J 15/08* (2006.01)
*F02F 1/24* (2006.01)
*F02F 11/00* (2006.01)

(52) U.S. Cl.
CPC ............ *F02F 7/0002* (2013.01); *F16J 15/0825* (2013.01); *F02F 1/243* (2013.01); *F02F 11/002* (2013.01); *F16J 2015/0868* (2013.01)

(58) Field of Classification Search
CPC ........... F02F 7/007; F02F 11/002; F02F 1/00; F01P 1/02; F01P 3/02
USPC .................... 123/193.5, 193.1, 193.2, 196 R; 277/591–598; 92/169.1
See application file for complete search history.

(56) References Cited

U.S. PATENT DOCUMENTS

| | | | | |
|---|---|---|---|---|
| 3,352,564 | A | * | 11/1967 | Johnson .................. F16J 15/123 277/593 |
| 5,890,719 | A | * | 4/1999 | Bettencourt .......... F02F 11/002 277/599 |
| 5,924,901 | A | * | 7/1999 | Takahashi .......... F01M 11/0004 123/196 W |
| 6,076,833 | A | * | 6/2000 | Geshi ................... F16J 15/0825 277/593 |
| 6,746,021 | B2 | | 6/2004 | Breen |
| 7,287,758 | B2 | | 10/2007 | Sanford |
| 8,117,835 | B2 | | 2/2012 | Mori |
| 8,245,685 | B2 | | 8/2012 | Reinhart et al. |
| 8,347,865 | B2 | | 1/2013 | Valencia et al. |
| 8,439,007 | B2 | | 5/2013 | Steiner et al. |
| 8,500,131 | B2 | | 8/2013 | Schweiger |
| 2007/0062478 | A1 | * | 3/2007 | Netsu ..................... F01M 11/02 123/193.5 |
| 2007/0102887 | A1 | | 5/2007 | Sandford |

(Continued)

*Primary Examiner* — Lindsay Low
*Assistant Examiner* — Long T Tran
(74) *Attorney, Agent, or Firm* — LeClairRyan

(57) ABSTRACT

A gasket for use with in an internal combustion engine having lubricating oil drainback passageways and an integrated exhaust manifold formed in the cylinder head is disclosed. The gasket includes at least one drainback passageway opening to fit substantially around the drainback passageways formed in the cylinder block. A loose component-capturing constraint feature is integrally formed with the gasket and effectively provides a bridge over the drainback passageway opening of the gasket. The constraint feature does not restrict the flow of lubricating oil and may be of any of several designs including, for example, a rib. The cylinder head gasket is preferably of a multi-layer construction and is preferably steel. The constraint feature may be a single gasket layer. The cylinder head gasket includes both active and non-active areas. The constraint feature may be either or both an active and a non-active area of the gasket.

20 Claims, 2 Drawing Sheets

(56) References Cited

U.S. PATENT DOCUMENTS

| | | | |
|---|---|---|---|
| 2007/0170659 A1* | 7/2007 | Hatamura | F16J 15/0818 277/595 |
| 2008/0062478 A1* | 3/2008 | Tatsuno | 358/509 |
| 2008/0093808 A1* | 4/2008 | Quick | B23K 26/0084 277/595 |
| 2008/0237998 A1 | 10/2008 | Chen et al. | |
| 2010/0012063 A1* | 1/2010 | Shoji | F01L 1/053 123/90.33 |
| 2010/0313860 A1* | 12/2010 | Miller | F01M 11/02 123/573 |
| 2011/0079187 A1 | 4/2011 | Steiner et al. | |
| 2013/0098315 A1* | 4/2013 | Beyer | F16J 15/0825 123/41.31 |

* cited by examiner

CYLINDER GASKET HAVING OIL DRAINBACK CONSTRAINT FEATURE FOR USE WITH INTERNAL COMBUSTION ENGINE

TECHNICAL FIELD

The disclosed invention relates generally to cylinder head gaskets for internal combustion engines having cylinder heads with integrated exhaust manifolds. More particularly, the disclosed inventive concept relates to methods and arrangements for constraining the passage of valvetrain components into lubricating oil drainkbacks of the cylinder block of such engines.

BACKGROUND OF THE INVENTION

A cylinder head of an internal combustion engine having an integrated exhaust manifold requires more flow-through of lubricating oil than engines having conventional cylinder heads. In such an arrangement, the integrated exhaust manifold requires the lubrication oil drainbacks to be packaged around the integrated exhaust port. Packaging the cross-sectional area required for proper engine function typically yields large drain areas for returning the circulated lubricating oil back to the engine oil pan areas.

While the larger drain areas provide effective lubricating oil flow patterns, they also increase the risk that improperly assembled and loose valvetrain components, such as a roller-finger follower or a valve retainer, may pass down to the cylinder block and oil pan areas. This situation can lead to catastrophic engine failure and/or reduced engine performance. Extensive service and disassembly time is required should valvetrain components need to be retrieved from oil pan areas.

As in so many areas of vehicle technology there is always room for improvement related to the use and operation of gaskets arrangements provided between cylinder blocks and cylinder heads in internal combustion engines.

SUMMARY OF THE INVENTION

The disclosed inventive concept overcomes the problems of known arrangements for the cylinder head of an internal combustion engine having an integrated exhaust manifold. Particularly, the disclosed inventive concept provides a gasket for use with a cylinder block in which the cylinder block has drainback passageways. The gasket includes at least one drainback passageway opening to fit substantially around the drainback passageways formed in the cylinder block. A loose component-capturing constraint feature is part of the gasket.

The constraint feature is integral with the gasket and effectively provides a bridge over the drainback passageway opening of the gasket. The constraint feature may be of any of several designs including, for example, one or more ribs.

The cylinder head gasket of the disclosed inventive concept is preferably of a multi-layer construction and is preferably steel. The constraint feature may be a single gasket layer. The cylinder head gasket includes both active and non-active areas. The constraint feature may be either or both an active and a non-active area.

The constraint feature of the disclosed inventive concept does not restrict the flow of the lubricating oil.

The constraint feature of the disclosed inventive concept constrains the entry of loose valvetrain components into the oil lubricant passageways of the cylinder block, thus preventing catastrophic engine failure and reduced performance. In addition, the constraint feature of the disclosed inventive concept minimizes or eliminates the need for extensive vehicle service and disassembly time that would ordinarily be required in the event of a loose component entering one or more lubricant passageways of the cylinder block.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
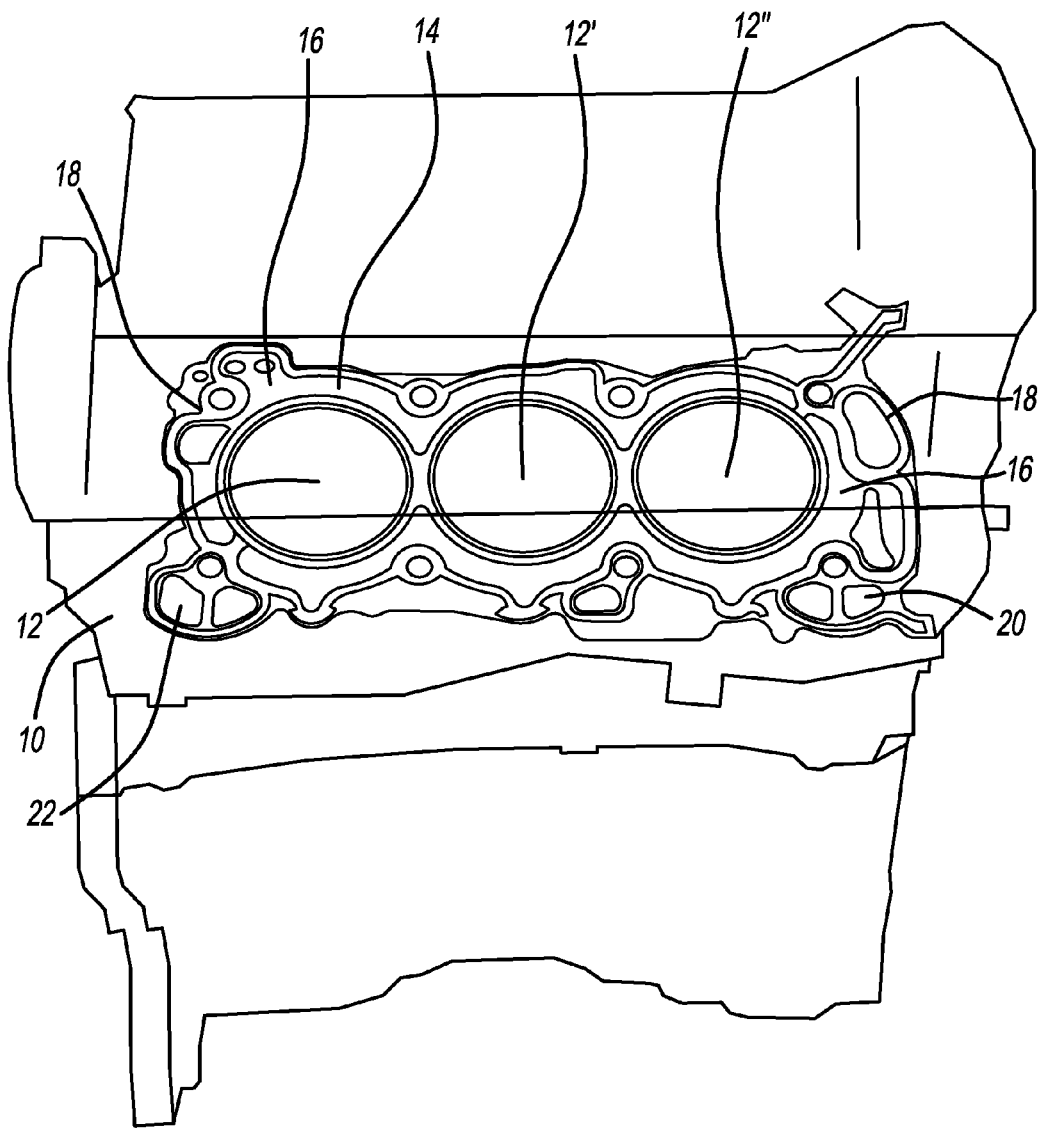
FIG. 1 shows a plan view of the multi-layer steel cylinder head gasket with the valvetrain component constraint in place on an engine block according to the disclosed inventive concept.

In the following figures, the same reference numerals will be used to refer to the same components. In the following description, various operating parameters and components are described for different constructed embodiments. These specific parameters and components are included as examples and are not meant to be limiting.

In general, the disclosed invention provides a multi-layer steel cylinder head gasket with valvetrain component constraint feature for use with an internal combustion engine having an integrated exhaust manifold requiring lubrication oil drainbacks packaged around the integrate exhaust ports.

Referring to FIG. 1, a block of an internal combustion engine, illustrated as cylinder block 10, is shown. The illustrated cylinder block 10 represents an exemplary V6 engine though it must be understood that the disclosed inventive concept can find application in any internal combustion engine having large drain areas that includes an integrated exhaust manifold. The cylinder block 10 comprises a plurality of cylinders 12, 12' and 12".

In arrangements where the cylinder head includes an overhead camshaft lubrication is required for the proper function of the valve actuating components. To supply the camshaft with oil an oil supply duct is connected to the camshaft receptacle. The supply of heated engine oil to the camshaft bearings and other moving parts of the valvetrain via the supply duct reduces the friction between moving components and further reduces the friction losses of the internal combustion engine. The integration of the exhaust manifold into the cylinder head typically requires large drain areas.

A cylinder head gasket 14 provides a fluid-tight seal between the cylinder block 10 and the cylinder head (not shown). The shape of the illustrated cylinder head gasket 14 is only suggestive as other shapes having different numbers of cylinder holes may be adopted without deviating from the spirit and scope of the disclosed inventive concept.

The cylinder head gasket 14 is preferably a multi-layer steel (MLS) type gasket. The cylinder head gasket 14 includes at least a first layer 16 and a second layer 18. The cylinder head gasket 14 includes both active or non-active layers as is understood in the art.

As shown in FIG. 1, a plurality of lubrication passages, such as an oil drainback 20 and an oil drainback 22 are located through the cylinder block 10 and provide oil under pressure from an oil pump (not shown) of the type usually employed in an internal combustion engine for providing higher pressure oil to the engine's bearings and other wear surfaces. The lubricating oil delivered to the cylinder head, having lubricated the bearings and other wear surfaces, then drains into the oil drainbacks 20 and 22 and through the cylinder block 10 to the oil pan areas of the engine (not shown).

Despite improvements in the manufacture of internal combustion engines for automotive vehicles it still may be the case that components are improperly assembled. In the event that valvetrain components are improperly assembled in the cylinder head a component may become loose and try to pass down one of the oil drainbacks 20 and 22 in the flow of lubricating oil on its way to the oil pan areas of the engine.

Figure 2:
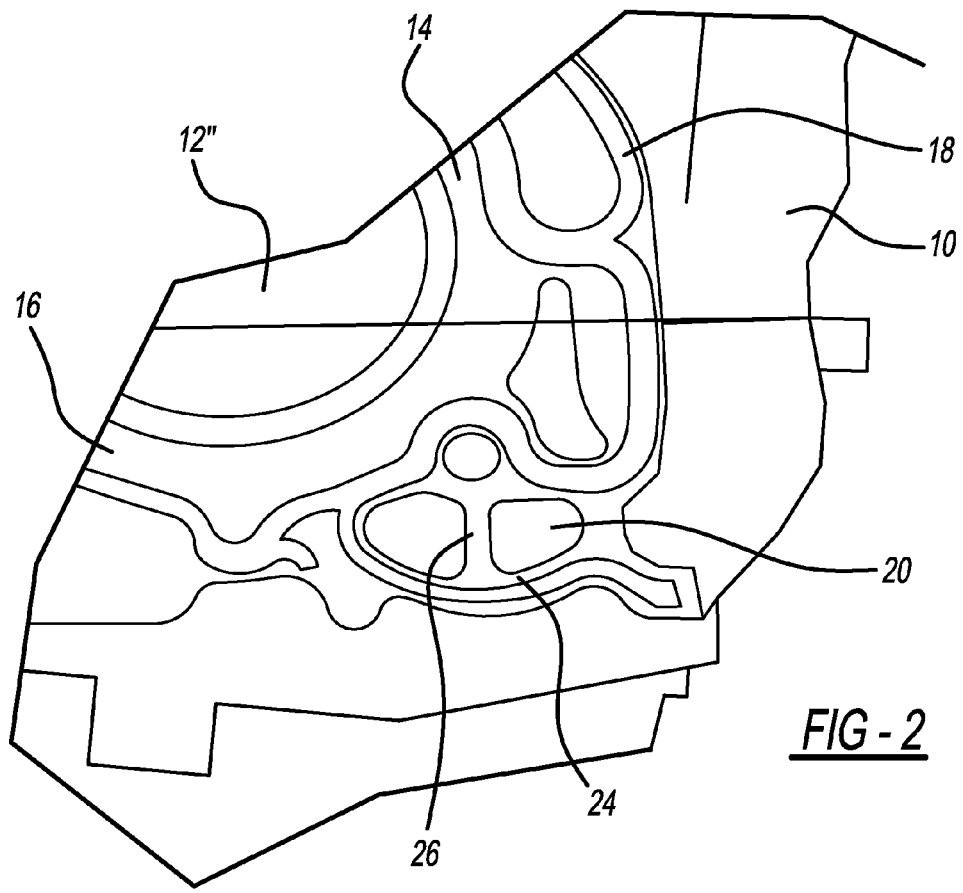
FIG. 2 illustrates a detailed portion of the multi-layer steel cylinder head gasket with the valvetrain component constraint of the disclosed inventive concept shown in FIG. 1 to illustrate an oil drainback.
Figure 3:
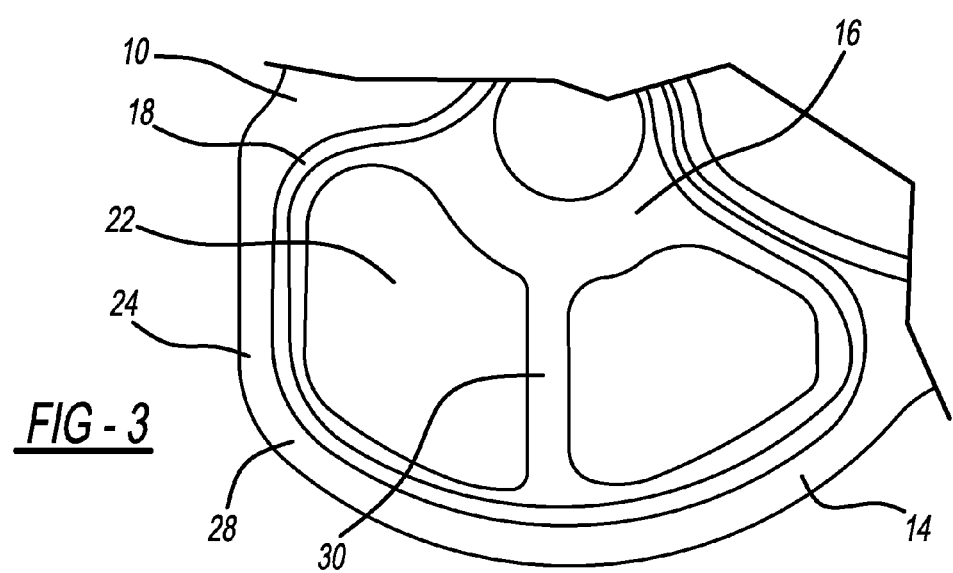
FIG. 3 illustrates a detailed portion of the multi-layer steel cylinder head gasket with the valvetrain component constraint of the disclosed inventive concept shown in FIG. 1 to illustrate another oil drainback.

FIGS. 2 and 3 illustrate detailed views of the oil drainbacks 20 and 22. With respect to FIG. 2, the oil drainback 20 is substantially surrounded by a drainback portion 24 of the cylinder head gasket 14. A constraint feature 26 in the form of a rib is provided that extends across the oil drainback 20. The constraint feature 26 is an integral element of the cylinder head gasket 14 and is preferably though not absolutely a single layer of the multi-layer steel cylinder head gasket 14.

With respect to FIG. 3, the oil drainback 22 is substantially surrounded by a drainback portion 28 of the cylinder head gasket 14. A constraint feature 30 in the form of a rib is provided that extends across the oil drainback 22. The constraint feature 30 is an integral element of the cylinder head gasket 14 and is preferably though not absolutely a single layer of the multi-layer steel cylinder head gasket 14.

The size and shape of the constraint features 26 and 30 as illustrated respectively in FIGS. 2 and 3 are only intended as being suggestive. It is to be understood that the constraint feature can be shaped in various ways to allow for proper function and manufacturing feasibility while permitting maximum flow-by of the passing lubricating oil. The constraint features can be part of the active layer or the non-active layer of the cylinder head gasket 14 or can be part of both the active layer and the non-active layer.

The disclosed invention as set forth above overcomes the challenges faced by known arrangements for lubricating oil flow in internal combustion engines having integrated exhaust manifolds by providing a practical and effectively non-interfering way to prevent stray valvetrain parts from passing out of the cylinder head and into the lubricating oil passageway of the cylinder block. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A system for an internal combustion engine having an integrated exhaust manifold comprising:
    a cylinder block having an oil drainback passageway;
    a cylinder head gasket having a drainback passageway opening defined by a wall, said gasket including a rib, said rib extending from one side of said opening to the other side of said same opening, subdividing said opening into a first smaller opening and a second smaller opening.

2. The system for an internal combustion engine of claim 1 wherein said cylinder head gasket is a multi-layer cylinder head gasket.

3. The system for an internal combustion engine of claim 2 wherein said multi-layer cylinder head gasket is a steel gasket.

4. The system for an internal combustion engine of claim 2 wherein said rib is defined by a single layer.

5. The system for an internal combustion engine of claim 1 wherein said cylinder head gasket includes active and non-active layers.

6. The system for an internal combustion engine of claim 5 wherein said rib is an active layer.

7. The system for an internal combustion engine of claim 5 wherein said rib is an inactive layer.

8. The system for an internal combustion engine of claim 5 wherein said rib is both an active layer and an inactive layer.

9. A system for an internal combustion engine having an integrated exhaust manifold comprising:
    a cylinder block having an oil drainback passageway, said passageway having an opening;
    a cylinder head gasket; and
    a constraint feature integral with said gasket that extends over said oil drainback passageway opening, said constraint feature subdividing said passageway opening into two passageway openings.

10. The system for an internal combustion engine of claim 9 wherein said constraint feature is a rib.

11. The system for an internal combustion engine of claim 10 wherein said cylinder head gasket is a multi-layer cylinder head gasket.

12. The system for an internal combustion engine of claim 11 wherein said multi-layer cylinder head gasket is a steel gasket.

13. The system for an internal combustion engine of claim 11 wherein said constraint feature is defined by a single layer.

14. The system for an internal combustion engine of claim 11 wherein said cylinder head gasket includes active and non-active layers.

15. The system for an internal combustion engine of claim 14 wherein said constraint feature is an active layer.

16. The system for an internal combustion engine of claim 14 wherein said constraint feature is an inactive layer.

17. The system for an internal combustion engine of claim 14 wherein said constraint feature is both an active layer and an inactive layer.

18. A cylinder head gasket for use in an internal combustion engine having an integrated exhaust manifold, the gasket comprising:
    an oil drainback passageway opening defined by a first side and a second side, said sides being opposite each other; and
    a constraint feature integral with the gasket, said constraint feature extending from said first side to said second side to divide said passageway opening.

19. The cylinder head gasket for use in an internal combustion engine of claim 18 wherein said constraint feature is a rib.

20. The cylinder head gasket for use in an internal combustion engine of claim 18 wherein the gasket is a multi-layer cylinder head gasket and wherein said constraint feature is defined by a single layer.

\* \* \* \* \*